July 1, 1924.                     1,499,566
C. A. VOLZ
RIM
Filed March 1, 1923          2 Sheets-Sheet 1

C. A. Volz,
Inventor

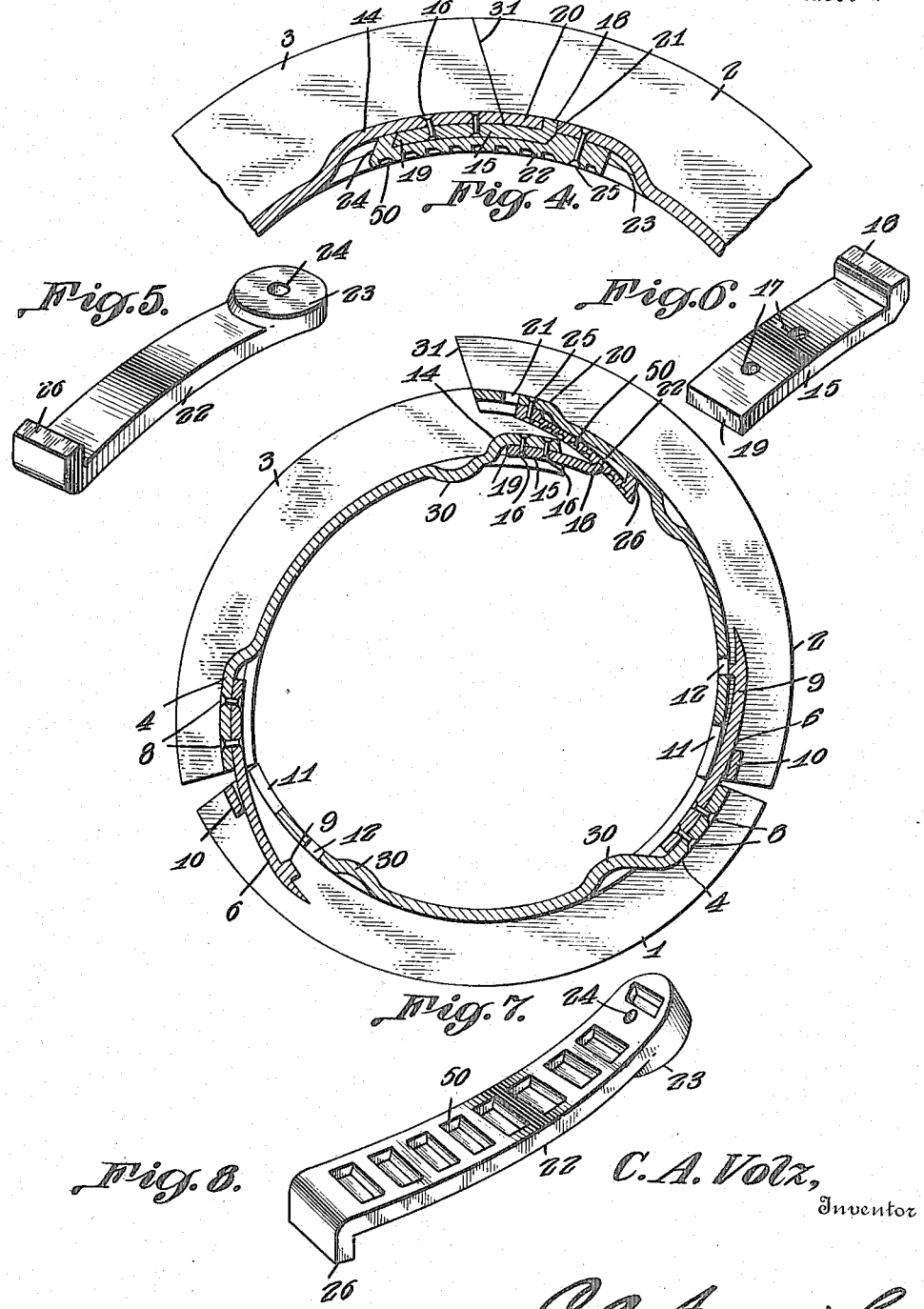

Patented July 1, 1924.

1,499,566

UNITED STATES PATENT OFFICE.

CHARLES A. VOLZ, OF PIGEON, MICHIGAN.

RIM.

Application filed March 1, 1923. Serial No. 622,079.

*To all whom it may concern:*

Be it known that I, CHARLES A. VOLZ, a citizen of the United States, residing at Pigeon, in the county of Huron and State of Michigan, have invented a new and useful Rim, of which the following is a specification.

This invention aims to provide a rim for vehicle tires which can be taken apart readily to facilitate the mounting of the tire on the rim, and to facilitate the detachment of the rim from the tire, novel means being provided for holding the constituent parts of the rim together.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
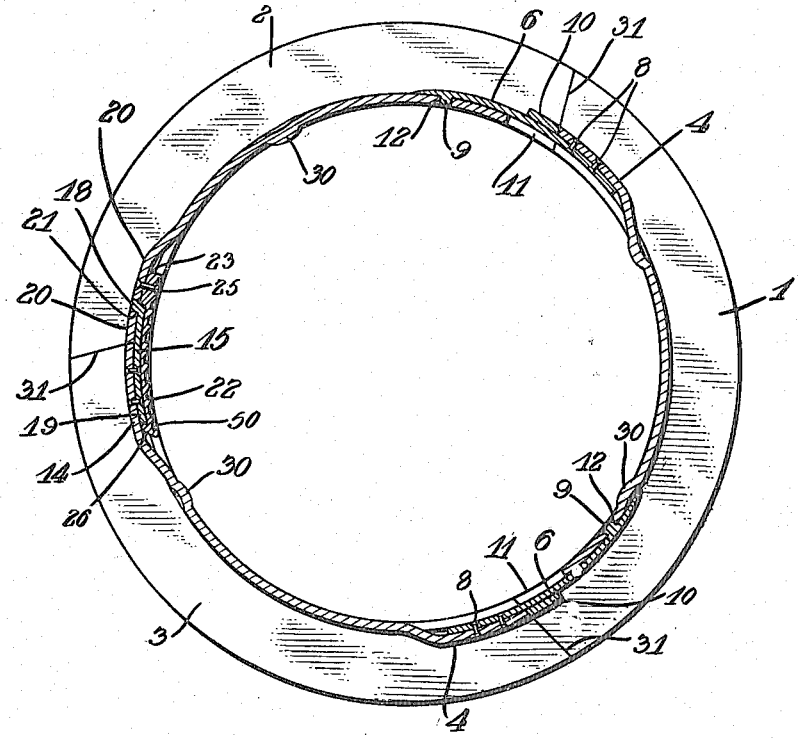
Figure 2:
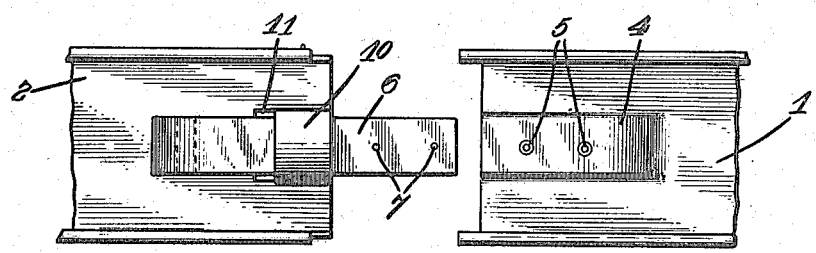
Figure 3:
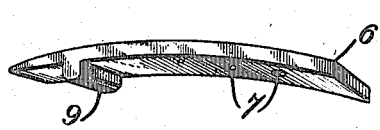

Figure 1 shows in longitudinal section, a rim constructed in accordance with the invention; Figure 2 is a plan view wherein the meeting ends of the parts of the rim and associated elements appear in spaced relation; Figure 3 is a perspective view showing the latch tongue; Figure 4 is a longitudinal section taken through the meeting ends of two parts of the rim; Figure 5 is a perspective view wherein the retainer appears; Figure 6 is a perspective view showing one of the latch tongues. Figure 7 is a sectional view showing the rim collapsed; and Figure 8 is a perspective view showing the keeper.

The rim forming the subject matter of this application is divided transversely along lines 31, on a bevel, to form sections 1, 2 and 3, supplied on their inner surfaces with spacing bosses 30, adapted to cooperate with the rim of the wheel whereon the device is mounted. At one end, the section 1 has a longitudinal socket 4, forming a recess, the socket having openings 5. One end of a latch tongue 6 is located in the socket 4, the tongue having openings 7 receiving securing elements 8, adapted to be mounted in the openings 5 of the socket 4 and holding the latch tongue 6 in place, the latch tongue projecting beyond the end of the section 1, as shown in Figure 1. The tongue 6 has an inwardly extended projection 9. The section 2 is provided with a transverse loop-shaped keeper 10 beneath which an opening 11 exists, the section 2 having a seat 12. The section 1 is connected to the section 3 by a mechanism of the sort above described, aside from the fact that the section 1 has the keeper 10, the latch tongue 6 being mounted on the section 3.

That end of the section 3 which is adjacent to the section 2 is provided with a longitudinal socket 14 forming a recess, wherein one end of a latch tongue 15 is held by securing elements 16, the tongue having openings 17 adapted for the reception of the securing elements. The latch tongue 15 is provided with a projection 18 at one end, the other end of the latch tongue being beveled as indicated at 19.

The numeral 20 marks a keeper extended longitudinally of the section 2 and forming a recess, the keeper having a seat 21. A resilient retainer 22 is provided and has a spacing boss 23 abutting against the keeper portion 20 of the section 2. In the boss 23, an opening 24 is formed, the same being adapted to receive a pivot element 25 whereby the retainer is held on the part 21 of the section 2 for swinging movement. At its free end, the resilient retainer 22 has a finger 26. On its inner surface, the retainer 22 is provided with a rack 50.

The tongue 6 of the section 1 may be inserted through the opening 11 of the section 2, beneath the keeper 10 of the section 2, and when the section 1 is swung outwardly with respect to the section 2, the projection 9 on the latch tongue 6 on the section 1 will be received in the seat 12 of the section 2. In a similar way, the section 3 may be assembled with the section 1. Assuming that the retainer 22 is swung around to assume the position shown in Figure 7, the projection 18 on the latch tongue 15 rides over the ratchet 50 of the retainer and finally engages in the seat 21 of the keeper 20 on the section 2. Then, the retainer 22 may be swung around into the position shown in Figure 4, the finger 26 on the retainer engaging with the beveled end 19 of the latch tongue 15, the sections 3 and 2 of the rim being held securely together.

What is claimed is:—

1. In a device of the class described, rim sections, one of which is provided with an outwardly offset keeper, the other of which carries a tongue which is insertable beneath the keeper, the tongue being provided on its inner surface with an inwardly extended projection spaced from the end of the tongue, the first-specified section having an opening adapted to receive the projection.

2. In a device of the class described, rim sections, one of which is provided with a tongue engaged at one end with the other section to hold the sections against circumferential separation, the other rim section carrying a pivoted retainer which engages the other end of the tongue to hold the sections against circumferential separation, the retainer being provided with a rack along which one end of the tongue rides when the retainer is reversed on its pivotal mounting.

3. In a device of the class described, rim sections, one of which is provided with a tongue engaged at one end with the other section to hold the sections against circumferential separation, the other rim section carrying a pivoted retainer which extends the full length of the tongue and engages the other end of the tongue to hold the sections against circumferential separation.

In testimony that I claim the foregoing as my own, I have hereto affixed my signature in the presence of two witnesses.

CHARLES A. VOLZ.

Witnesses:
ERNEST CLABUESCH,
VERNE M. GEIGU.